US010066032B2

(12) United States Patent
Votruba-Drzal et al.

(10) Patent No.: US 10,066,032 B2
(45) Date of Patent: Sep. 4, 2018

(54) TREATED FILLERS, COMPOSITIONS CONTAINING SAME, AND ARTICLES PREPARED THEREFROM

(71) Applicant: PPG Industries Ohio, Inc., Cleveland, OH (US)

(72) Inventors: Peter Lawrence Votruba-Drzal, Pittsburgh, PA (US); Justin Jonathan Martin, Irwin, PA (US); Timothy Allen Okel, Trafford, PA (US); Raphael O. Kollah, Wexford, PA (US); Truman Wilt, Clinton, PA (US); Clint Steven Edelman, Pittsburgh, PA (US); Brittany Smith, Murrysville, PA (US); Luke Andrew Wolfe, Union City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 253 days.

(21) Appl. No.: 14/508,539

(22) Filed: Oct. 7, 2014

(65) Prior Publication Data
US 2015/0099825 A1 Apr. 9, 2015

Related U.S. Application Data

(60) Provisional application No. 61/887,713, filed on Oct. 7, 2013.

(51) Int. Cl.
| *C08K 3/36* | (2006.01) |
| *C08K 9/04* | (2006.01) |
| *C08F 8/42* | (2006.01) |
| *C09C 3/00* | (2006.01) |
| *C09C 1/30* | (2006.01) |
| *C09C 3/12* | (2006.01) |
| *C09C 3/10* | (2006.01) |
| *C09C 3/08* | (2006.01) |
| *C08K 5/09* | (2006.01) |
| *C08L 7/02* | (2006.01) |
| *C08L 9/08* | (2006.01) |
| *C08L 33/02* | (2006.01) |
| *C04B 14/06* | (2006.01) |

(52) U.S. Cl.
CPC .................. *C08F 8/42* (2013.01); *C08K 5/09* (2013.01); *C08K 9/04* (2013.01); *C08L 7/02* (2013.01); *C08L 9/08* (2013.01); *C08L 33/02* (2013.01); *C09C 1/309* (2013.01); *C09C 1/3063* (2013.01); *C09C 1/3072* (2013.01); *C09C 1/3081* (2013.01); *C09C 3/006* (2013.01); *C09C 3/08* (2013.01); *C09C 3/10* (2013.01); *C09C 3/12* (2013.01); *C01P 2006/12* (2013.01); *C01P 2006/22* (2013.01); *C01P 2006/80* (2013.01); *C04B 14/066* (2013.01); *C08K 3/36* (2013.01); *C08L 2666/58* (2013.01)

(58) Field of Classification Search
None
See application file for complete search history.

(56) References Cited

U.S. PATENT DOCUMENTS

| 3,004,936 A | 10/1961 | Howland et al. |
| 3,873,489 A | 3/1975 | Thurn et al. |
| 4,328,041 A | 5/1982 | Wilson |
| 4,348,311 A | 9/1982 | Machurat et al. |
| 4,530,959 A | 7/1985 | Armbruster et al. |
| 4,616,065 A | 10/1986 | Hargis et al. |
| 4,748,199 A | 5/1988 | Takiguchi et al. |
| 4,866,131 A | 9/1989 | Fujimaki et al. |
| 4,894,420 A | 1/1990 | Scriver |
| 4,925,894 A | 5/1990 | Futamura |
| 5,082,901 A | 1/1992 | Linster |
| 5,162,409 A | 11/1992 | Mroczkowski |
| 5,580,919 A | 12/1996 | Agostini et al. |
| 5,616,316 A | 4/1997 | Persello |
| 6,296,860 B1 | 10/2001 | Hasegawa et al. |
| 6,342,100 B1 | 1/2002 | Nover et al. |
| 7,569,107 B2 | 8/2009 | Boyer et al. |

(Continued)

FOREIGN PATENT DOCUMENTS

| CN | 103073754 A | 5/2013 |
| EP | 1362884 A1 | 11/2003 |

(Continued)

OTHER PUBLICATIONS

Bonilla-Cruz et al., "Towards Controlled Graft Polymerization of Poly[styrene-co-(maleic anhydride)] on Functionalized Silica Mediated by Oxoaminium Bromide Salt. Facile Synthetic Pathway Using Nitroxide Chemistry", Macromolecular Rapid Communications, Jul. 2, 2007, pp. 1397-1403, vol. 28.
Ghosh et al., "Surface modification of nano-silica with amides and imides for use in polyester nanocomposites", Journal of Materials Chemistry A, Mar. 25, 2013, pp. 6073-6080, vol. 1, XP-002732563.
Rosen et al., "Surface Functionalization of Silica Nanoparticles with Cysteine: A Low-Fouling Zwitterionic Surface", Jul. 15, 2011, pp. 10507-10513, vol. 27, ACS Publications.
Yoshinaga et al., "Surface modification of fine colloidal silica with copolymer silane-coupling agents composed of maleic anhydride", Colloid Polymer Science, 2002, pp. 85-89, vol. 280, XP-002732564.

(Continued)

Primary Examiner — Richard A Huhn
(74) Attorney, Agent, or Firm — The Webb Law Firm

(57) ABSTRACT

The present invention includes a process for producing treated filler that includes (a) treating a slurry that includes untreated filler where the untreated filler has not been previously dried, with a treating composition that includes a treating agent, thereby forming a treated filler slurry, and (b) drying the treated filler slurry to produce treated filler. The treating agent can include an unsaturated fatty acid, derivative of an unsaturated fatty acid, or salt thereof. The present invention also is directed to treated filler prepared by the process, as well as rubber compounding compositions and tires including the treated filler.

20 Claims, No Drawings

(56) References Cited

U.S. PATENT DOCUMENTS

| | | |
|---|---|---|
| 2003/0135006 A1 | 7/2003 | Materne et al. |
| 2004/0030028 A1 | 2/2004 | Resendes et al. |
| 2006/0281009 A1* | 12/2006 | Boyer .................. C08K 9/04 |
| | | 429/247 |
| 2009/0214449 A1 | 8/2009 | Valero et al. |
| 2010/0144950 A1* | 6/2010 | Woloszynek ......... B60C 1/0016 |
| | | 524/445 |
| 2010/0261803 A1 | 10/2010 | Bismarck et al. |
| 2011/0003922 A1 | 1/2011 | Jiang et al. |
| 2011/0013938 A1 | 1/2011 | Tonohiro |
| 2011/0136970 A1 | 6/2011 | Koster et al. |
| 2013/0079445 A1 | 3/2013 | Martin et al. |
| 2015/0031821 A1 | 1/2015 | Shiono et al. |

FOREIGN PATENT DOCUMENTS

| | | |
|---|---|---|
| JP | 2009019098 A | 1/2009 |
| JP | 201292166 A | 5/2012 |
| JP | 2012187635 A | 10/2012 |
| RU | 2200709 C2 | 3/2003 |
| SU | 713878 A1 | 2/1980 |
| WO | 2006125927 A1 | 11/2006 |
| WO | 2013043955 A1 | 3/2013 |
| WO | 2013129394 A1 | 7/2015 |

OTHER PUBLICATIONS

Zhou et al., "Preparation and Properties of Poly(styrene-co-maleic anhydride)/Silica Hybrid aterials by the in Situ Sol-Gel Process", Journal of Polymer Science Part A: Polymer Chemistry, Jul. 30, 1998, pp. 1607-1613, vol. 36, No. 10, John Wiley & Sons, Inc., XP-002562964.

X. Ding et al., "Silica nanoparticles encapsulated by polystyrene via surface grafting and in situ emulsion polymerization." Materials Letters 58:25 (2004): 3126-3130. North Holland Publishing Company.

AR Mahdayian et al., "Nanocomposite particles with core-shell morphology III: preparation and characterization of nano Al2O3-poly(styrene-methyl methacrylate) particles via miniemulsion polymerization." Polymer Bulletin 63:3 (2009): 329-340. Springer.

* cited by examiner

TREATED FILLERS, COMPOSITIONS CONTAINING SAME, AND ARTICLES PREPARED THEREFROM

CROSS REFERENCE TO RELATED APPLICATIONS

This application claims the benefit of U.S. Provisional Application No. 61/887,713, filed Oct. 7, 2013, which is hereby incorporated herein its entirety by reference.

STATEMENT REGARDING FEDERALLY SPONSORED RESEARCH AND DEVELOPMENT

This invention was made with government support under Contract No. DE-EE0005359 awarded by the United States Department of Energy. The government has certain rights in this invention.

FIELD OF INVENTION

The present invention is related to a process for the preparation of treated filler, treated filler produced by the process, and compositions and articles containing such treated filler.

BACKGROUND OF THE INVENTION

The use of silica/silane filler systems to reduce the rolling resistance and improve the wet traction of passenger car and truck tires is known in the art. A reduction of rolling resistance results in less fuel consumption.

The simultaneous improvement of rolling resistance, wear and traction, known as expanding the "magic triangle", requires new approaches to rubber composite development. Precipitated silica has played a major role in the emergence of the green tire, which boasts a large improvement in rolling resistance compared to past technologies. The direct cross-linking of silica (via coupling) into a highly cross-linked polymer matrix, while minimizing interactions between silica particles, is believed to be of vital importance to desirable dynamic mechanical properties of rubber used in the production of passenger car and truck tires. It has been noted that in natural rubber (typically used in the production of truck tires), the proteins present from natural rubber biosynthesis can adsorb preferentially to the silica surface, interfering with the in-situ coupling reaction. Increased dump temperatures, which might improve the coupling efficiency, have also been shown to degrade natural rubber. Thus, there continues to be a need in the rubber industry for improved silica-rubber coupling materials.

Further, it has been found that the incorporation of high surface area filler materials into rubber compositions can cause an undesirable increase in viscosity thereby limiting the amount of high surface area material that can be included in the rubber composition due to process problems. Thus, there is a need to treat such high surface materials (e.g., precipitated silica) with materials which can serve as to render the high surface materials more compatible with the polymeric matrix into which they are being incorporated, improve processing viscosity and prevent phase separation of the high surface materials from the polymeric matrix.

SUMMARY OF THE INVENTION

In accordance with the present invention, there is provided a process for producing treated filler that includes: (a) treating a slurry that includes untreated filler where the untreated filler has not been previously dried, with a treating composition that includes a treating agent, thereby forming a treated filler slurry; and (b) drying the treated filler slurry to produce treated filler. The treating agent can include at least one of an unsaturated fatty acid comprising a linear or branched, optionally substituted $C_4$ to $C_{38}$ alkyl having at least one carbon-carbon double bond; a derivative of said unsaturated fatty acid of (i), wherein at least one carbon-carbon double bond is reacted to include at least one functional group; and/or a salt of said unsaturated fatty acid of (i). Said unsaturated fatty acid (i), said unsaturated fatty acid of said derivative (ii), and said unsaturated fatty acid of said salt (iii) are in each case the same or different.

In accordance with the present invention, there is further provided a process for producing treated precipitated silica that includes: (a) combining an alkali metal silicate and an acid to form a slurry that includes untreated silica, where the untreated silica has not been previously dried; (b) treating said slurry with a treating composition that includes a treating agent, thereby forming a treated slurry; and (c) drying said treated slurry to produce treated precipitated silica. The treating agent can include at least one of an unsaturated fatty acid comprising a linear or branched, optionally substituted $C_4$ to $C_{38}$ alkyl having at least one carbon-carbon double bond; a derivative of said unsaturated fatty acid of (i), wherein at least one carbon-carbon double bond is reacted to include at least one functional group; and/or a salt of said unsaturated fatty acid of (i). Said unsaturated fatty acid (i), said unsaturated fatty acid of said derivative (ii), and said unsaturated fatty acid of said salt (iii) are in each case the same or different.

In accordance with the present invention, there is further provided a process for producing a treated precipitated silica that includes: (a) combining an alkali metal silicate and an acid to form an untreated slurry that includes untreated silica, where the untreated silica has not been previously dried; (b) drying the untreated slurry to produce dried precipitated silica; (c) forming an aqueous slurry of the dried precipitated silica with a treating composition that includes a treating agent, and, optionally, a coupling agent and/or, optionally, a non-coupling agent to form a treated precipitated silica slurry; and (d) drying the treated precipitated silica slurry to produce a dried treated precipitated silica. The treating agent can include at least one of an unsaturated fatty acid comprising a linear or branched, optionally substituted $C_4$ to $C_{38}$ alkyl having at least one carbon-carbon double bond; a derivative of said unsaturated fatty acid of (i), wherein at least one carbon-carbon double bond is reacted to include at least one functional group; and/or a salt of said unsaturated fatty acid of (i). Said unsaturated fatty acid (i), said unsaturated fatty acid of said derivative (ii), and said unsaturated fatty acid of said salt (iii) are in each case the same or different.

In accordance with the present invention, there is also provided treated filler prepared by the processes described herein, as well as rubber compositions such as rubber compounding compositions including the treated filler, and rubber articles that include the treated filler of the present invention.

DETAILED DESCRIPTION OF THE INVENTION

As previously mentioned, the present invention provides a process for producing treated filler. The process can include: (a) treating a slurry that can include untreated filler where the untreated filler has not been previously dried, with a treating composition comprising a treating agent, thereby forming a treated filler slurry; and (b) drying the treated filler slurry to produce treated filler.

As used herein, with reference to filler (such as, treated and/or untreated filler), the term "not been previously dried" means filler that, prior to the treatment process, has not been dried to a moisture content of less than 20 percent by weight. For purposes of the present invention, untreated filler does not include filler that has been previously dried to a moisture content of less than 20 percent by weight and then rehydrated.

As used herein, the term "filler" means an inorganic material such as an inorganic oxide that can be used in a polymer composition to improve at least one property of the polymer. As used herein, the term "slurry" means a mixture including at least filler and water.

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{36}$ alkyl groups; and groups that are appropriately branched, such as branched $C_3$-$C_{36}$ alkyl groups.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycycloalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups, such as $N(R_{11}')(R_{12}')$ where $R_{11}'$ and $R_{12}'$ are each independently selected, with some embodiments, from hydrogen, linear or branched $C_1$-$C_{20}$ alkyl, $C_3$-$C_{12}$ cycloakyl, $C_3$-$C_{12}$ heterocycloalkyl, aryl, and heteroaryl.

Some compounds that can be used with the method of the present invention include groups and sub groups that can in each case be independently selected from hydrocarbyl and/or substituted hydrocarbyl and/or functional hydrocarbyl (or hydrocarbyl groups having one or more functional groups). As used herein, and in accordance with some embodiments, the term "hydrocarbyl" and similar terms, such as "hydrocarbyl substituent," means: linear or branched $C_1$-$C_{36}$ alkyl (e.g., linear or branched $C_1$-$C_{10}$ alkyl); linear or branched $C_2$-$C_{36}$ alkenyl (e.g., linear or branched $C_2$-$C_{10}$ alkenyl); linear or branched $C_2$-$C_{36}$ alkynyl (e.g., linear or branched $C_2$-$C_{10}$ alkynyl); $C_3$-$C_{12}$ cycloalkyl (e.g., $C_3$-$C_{10}$ cycloalkyl); $C_5$-$C_{18}$ aryl (including polycyclic aryl groups) (e.g., $C_5$-$C_{10}$ aryl); and $C_6$-$C_{24}$ aralkyl (e.g., $C_6$-$C_{10}$ aralkyl).

Representative alkyl groups include but are not limited to methyl, ethyl, propyl, isopropyl, butyl, isobutyl, sec-butyl, tert-butyl, pentyl, neopentyl, hexyl, heptyl, octyl, nonyl and decyl. Representative alkenyl groups include but are not limited to vinyl, allyl and propenyl. Representative alkynyl groups include but are not limited to ethynyl, 1 propynyl, 2-propynyl, 1-butynyl, and 2-butynyl. Representative cycloalkyl groups include but are not limited to cyclopropyl, cyclobutyl, cyclopentyl, cyclohexyl, and cyclooctyl substituents. Representative aralkyl groups include but are not limited to benzyl, and phenethyl.

The term "substituted hydrocarbyl" and similar terms, such as "functional hydrocarbyl" (or hydrocarbyl having at least one functional group) as used herein means a hydrocarbyl group in which at least one hydrogen thereof has been substituted with a group that is other than hydrogen, such as, but not limited to, halo groups, hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (e.g., alkyl, alkenyl, alkynyl, cycloalkyl, aryl, and aralkyl groups), heterocycloalkyl groups, heteroaryl groups, and amine groups, such as —$N(R_{11}')(R_{12}')$ where $R_{11}'$ and $R_{12}'$ are each independently selected from hydrogen, hydrocarbyl and substituted hydrocarbyl.

The term "alkyl" as used herein, in accordance with some embodiments, means linear or branched alkyl, such as but not limited to, linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, those recited previously herein. Alkyl groups of the various compounds of the present invention can, with some embodiments, include one or more unsaturated linkages selected from —CH═CH— groups and/or one or more —C≡C— groups, provided the alkyl group is free of two or more conjugated unsaturated linkages. With some embodiments, the alkyl groups are free of unsaturated linkages, such as CH═CH groups and —C≡C— groups.

The term "cycloalkl" as used herein, in accordance with some embodiments, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, those recited previously herein. The term "cycloalkyl" as used herein in accordance with some embodiments also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein, in accordance with some embodiments, means groups that are appropriately cyclic (having at least one heteroatom in the cyclic ring), such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl, and piperidinyl. The term "heterocycloalkyl" as used herein, in accordance with some embodiments, also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro 1H isochromenyl.

As used herein, and in accordance with some embodiments, the term "aryl" includes $C_5$-$C_{18}$ aryl, such as $C_5$-$C_{10}$ aryl (and includes polycyclic aryl groups, including polycyclic fused ring aryl groups). Representative aryl groups include but are not limited to phenyl, naphthyl, anthracynyl and triptycenyl.

The term "heteroaryl," as used herein, in accordance with some embodiments, means aryl groups having at least one heteroatom in the ring, and includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, furanyl, pyranyl, pyridinyl, isoquinoline, and pyrimidinyl.

As used herein, the term "fused ring polycyclic-aryl-alkyl group" and similar terms such as, fused ring polycyclic-alkyl-aryl group, fused ring polycyclo-aryl-alkyl group, and fused ring polycyclo-alkyl-aryl group means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to indenyl, 9H-fluorenyl, cyclopentanaphthenyl, and indacenyl.

The term "aralkyl" as used herein, and in accordance with some embodiments, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, those recited previously herein.

Suitable untreated fillers for use in process of the present invention can include a wide variety of materials known to one having ordinary skill in the art. Non-limiting examples can include inorganic oxides such as inorganic particulate and amorphous solid materials which possess either oxygen (chemisorbed or covalently bonded) or hydroxyl (bound or free) at an exposed surface, such as but not limited to oxides of the metals in Periods 2, 3, 4, 5 and 6 of Groups Ib, IIb, IIIa, IIIb, IVa, IVb (except carbon), Va, VIa, VIIa and VIII of the Periodic Table of the Elements in Advanced Inorganic Chemistry: A Comprehensive Text by F. Albert Cotton et al., Fourth Edition, John Wiley and Sons, 1980. Non-limiting examples of suitable inorganic oxides can include but are not limited to aluminum silicates, silica such as silica gel, colloidal silica, precipitated silica, and mixtures thereof.

The inorganic oxide can be silica with some embodiments. For example, in certain embodiments, the inorganic oxide can include precipitated silica, colloidal silica, and mixtures thereof. The silica can have an average ultimate particle size of less than 0.1 micron, or greater than 0.001 micron, or from 0.01 to 0.05 micron, or from 0.015 to 0.02 micron, as measured by electron microscope. Further, the silica can have a surface area of from 25 to 1000 square meters per gram, such as from 75 to 250 square meters per gram, or from 100 to 200 square meters per gram, as determined by the Brunauer, Emmett, and Teller (BET) method in accordance with ASTM D1993-91. With some embodiments, the filler is precipitated silica.

As previously mentioned, the untreated filler slurry is treated with a treating composition that can include a treating agent. In certain embodiments, the treating agent can act as a coupling agent. The term "coupling agent" as used herein means a material that binds (ionically or covalently) to (i) groups present on the surface of the filler particle (such as on the silica surface), as well as to (ii) functional groups present on the component(s) of the polymeric matrix into which the filler is incorporated. Thus, the filler particles can be "coupled" to the components in the polymeric matrix.

Alternatively, with some embodiments, the treating agent can act as a non-coupling agent. The term "non-coupling agent" as used herein means a material that serves to compatibilize the treated filler with the polymeric composition in which the treated filler ultimately is used. That is, the non-coupling agent can affect the free surface energy of the treated filler particles to make the treated filler particles have a surface energy similar to that of the polymeric composition. This facilitates incorporation of the treated filler into the polymeric composition, and can serve to improve (such as, decrease) mix viscosity of the composition. It should be noted that non-coupling agents are not expected to couple with the rubber matrix beyond Van der Waal interactions. As used herein, the term "non-coupling agent" can be used interchangeably with "compatibilizer".

It should be noted that many of the treatment agents may simultaneously function as both a coupling agent and a non-coupling agent/compatibilizer.

The treating agents utilized in the methods of the present invention are those that comprise an unsaturated fatty acid and salts thereof. The term "unsaturated fatty acid" as used herein means carboxylic acids having a long hydrocarbon chain with at least one carbon-carbon double bond in the hydrocarbon chain. A monounsaturated fatty acid includes a single carbon-carbon double bond in the hydrocarbon chain, while a polyunsaturated fatty acid includes two or more carbon-carbon double bonds.

With some embodiments, the unsaturated fatty acids derivatives thereof, and salts thereof can be represented by the following Formula (A):

$$ZO-C(O)-R \qquad (A).$$

With reference to Formula (A), with some embodiments Z can be $H^+$ and R can be a linear or branched, optionally substituted $C_4$ to $C_{38}$ alkyl having at least one carbon-carbon double bond. As used herein, "derivatives" means dimers (for example, and without limitation, dimers of undecylenic acid) and substituted products. With some other embodiments, the unsaturated fatty acid can be functionalized at one or more unsaturated groups (carbon-carbon double bonds). By "functionalized" it is meant that a functional group, as described herein, can be added at the site of a carbon-carbon double bond through a reaction. That is, the double bond may be broken and a functional group may be provided.

With some embodiments, useful unsaturated fatty acids include those that are at least minimally dispersable/soluble in water. Unsaturated fatty acids useful in the present invention include, for example and without limitation, monounsaturated fatty acids such as oleic acid ($CH_3(CH_2)_7CH=CH(CH_2)_7COOH$), ricinoleic acid ($CH_3(CH_2)_5CH(OH)CH_2CH=CH(CH_2)_7COOH$), palimotelic acid ($CH_3(CH_2)_5CH=CH(CH_2)_7COOH$), vaccenic acid ($CH_3(CH_2)_5CH=CH(CH_2)_9COOH$), paullinic acid ($CH_3(CH_2)_5CH=CH(CH_2)_{11}COOH$), eladic acid ($CH_3(CH_2)_7CH=CH(CH_2)_7COOH$), gondoic acid ($CH_3(CH_2)_7CH=CH(CH_2)_9COOH$), erucic acid ($CH_3(CH_2)_7CH=CH(CH_2)_{11}COOH$), nervonic acid ($CH_3(CH_2)_7CH=CH(CH_2)_{13}COOH$), undecylenic acid ($CH_2=CH(CH_2)_8COOH$). Unsaturated fatty acids useful in the present invention include, for example and without limitation, polyunsaturated fatty acids such as linoleic acid ($CH_3(CH_2)_4(CH=CHCH_2)_2(CH_2)_6COOH$), conjugated lineoleic acids, α-linolenic acid ($CH_3CH_2CH=CHCH_2CH=CHCH_2CH=CH(CH_2)_7COOH$), γ-linolenic acid ($CH_3(CH_2)_4CH=CHCH_2CH=CHCH_2CH=CH(CH_2)_4COOH$), dihomo-γ-linolenic acid ($CH_3(CH_2)_4CH=CHCH_2CH=CHCH_2CH=CH(CH_2)_6COOH$), linolenic acid ($CH_3CH_2(CH=CHCH_2)_3(CH_2)_6COOH$), arachidonic acid ($CH_3(CH_2)_4(CH=CHCH_2)_4(CH_2)_2COOH$), stearidonic acid ($CH_3CH_2CH=CHCH_2CH=CHCH_2CH=CHCH_2CH=CH(CH_2)_4COOH$), eicosapentaenoic acid ($CH_3CH_2CH=CHCH_2CH=CHCH_2CH=CHCH_2CH=CHCH_2CH=CH(CH_2)_3COOH$), docosahexaenoic acid ($CH_3CH_2CH=CHCH_2CH=CHCH_2CH=CHCH_2CH=CHCH_2CH=CHCH_2CH=CH(CH_2)_2COOH$), docosatetraenoic acid ($CH_3(CH_2)_4CH=CHCH_2CH=CHCH_2CH=CHCH_2CH=CH(CH_2)_5COOH$), α- and β-eleostearic acid ($CH_3(CH_2)_3(CH=CH)_3(CH_2)_7COOH$), calendic acid ($CH_3(CH_2)_4(CH=CH)_3(CH_2)_6COOH$), and mead acid ($CH_3(CH_2)_7CH=CHCH_2CH=CHCH_2CH=CH(CH_2)_3COOH$). As used herein, the term unsaturated fatty acid includes both cis and trans isomers thereof.

With some embodiments, the fatty acid includes a linear or branched, optionally substituted $C_{10}$-$C_{18}$ alkyl R group having at least one carbon-carbon double bond therein. With some non-limiting embodiments, the unsaturated fatty acid is a monounsaturated fatty acid. With some non-limiting embodiments, the unsaturated fatty acid is at least one of oleic acid or a salt thereof and undecylenic acid or a salt thereof. With some additional non-limiting embodiments, the unsaturated fatty acid is oleic acid or a salt thereof. With some further non-limiting embodiments, the salt of oleic acid is sodium oleate. With some additional non-limiting embodiments, the unsaturated fatty acid is undecylenic acid or a salt thereof. With some additional non-limiting embodiments, the salt of undecylenic acid is sodium undecylenate.

Unsaturated fatty acids or salts thereof can be obtained from any suitable commercial source, for example from Sigma-Aldrich Corp. (St. Louis, Mo., USA) and Thermo Fisher Scientific, Inc. (Waltham, Mass., USA).

With some embodiments, the R of the unsaturated fatty acid includes a side chain having one or more substituents (or functional groups). Additionally, as disclosed previously, with some embodiments the unsaturated fatty acid can be functionalized at one or more unsaturated groups (carbon-carbon double bonds). That is, the double bond may be broken and a substituent group may be provided. Non-exclusive examples of substituents on the R or the functionalized unsaturated group can include the general categories of alkyls, alkenyls, alkynyls, phenyls, benzyls, halos (including fluoro, chloro, bromo, and iodo groups), hydroxyls, carbonyls, aldehydes, haloformyls, carbonate esters, carboxylates, carboxyls, esters, methoxys, hydroperoxys, peroxys, ethers, hemiacetals, hemiketals, acetals, ketals, orthoesters, methylenedioxys, orthocarbonate esters, carboxamides, primary amines, secondary amines, tertiary amines, quarternary ammoniums, imines (primary ketimines, secondary ketimines, primary aldimines, secondary aldimines), imides, azides, azos, cyanates, isocyanates, nitrates, nitriles, isonitriles, nitrosooxys, nitros, nitrosos, pyridyls, sulfhydryls (thiols), sulfides, disulfides, sullfinyls, sulfonyls sulfinos, sulfos, thiocyanates, isothiocyanates, carbonothioyls, phosphinos, phosphonos, phosphates, and derivatives thereof. As used herein, "derivatives" means salts, ring opened products, and substituted products.

Functionalizing either the side chain or the carbon-carbon double bond of an unsaturated fatty acid can be accomplished in accordance with art-recognized methods. These methods include, but are not limited to, free radical addition, electrophilic addition, nucleophilic addition, pericyclic addition, and metal-catalyzed additions across (or to) at least one carbon-carbon double bond.

As described previously, with some embodiments the treating agent is a salt of an unsaturated fatty acid. With reference again to Formula (A):

$$ZO-C(O)-R \qquad (A),$$

with some embodiments R can be a linear or branched, optionally substituted $C_4$ to $C_{38}$ alkyl having at least one carbon-carbon double bond and Z is a cation (salt of an unsaturated fatty acid) and can be any alkali metal cation, alkaline earth metal cation, transition metal cation, ammonia, or quaternary ammonium cation. Alkali metal cations include, but are not limited to, $Na^+$ and $K^+$. Alkaline earth metal cations include, but are not limited to, $Mg^{2+}$ and $Ca^{2+}$. Transition metal cations include, but are not limited to, $Cd^{2+}$ and $Mn^{2+}$. Quarternary ammonium cations include, but are not limited to, those represented by the following Formula (B):

$$^+N(R)_4 \qquad (B).$$

With reference to Formula (B), each R is independently a linear or branched $C_1$-$C_{12}$ alkyl group or an aryl group.

With some embodiments, the treating agent comprises an unsaturated fatty acid having a polar side chain. Examples of polar groups that can be on or define the polar side chain of the R of Formula (A) include, but are not limited to, hydroxyl, thiol, carboxyl, phenol, amine, carboxamide, imidazole, and indole groups. Those of skill in the art will understand that the side chain need not be charged in order for it to be polar, and that is sufficient that the side chain be attracted to/attractive to water.

With some embodiments, the polar side chain of the R of Formula (A) useful in the present invention are ionizable, or ionized, side chains having, for example and without limitation, hydroxyl, phenol, thiol, imidazole, guanidinium, amine, and ammonium groups. However, those of skill in the art will appreciate that the aforementioned are merely exemplary, and that unsaturated fatty acids that have functional sidechains (for example, and without limitation, polar and/or ionizable/ionized side chains) for bonding, reacting, or interacting with groups present on the surface of the filler particle and/or the polymeric matrix are useful in the processes and methods of the present invention.

With some embodiments, in addition to the treatment agents listed above, the treating composition can further include a first or additional coupling agent that is different than the treating agent. In certain embodiments, the coupling agent can include any of a variety of organosilanes. Examples of suitable organosilanes that can be used with some embodiments of the present invention include those represented by Formula (I):

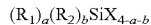

$(R_1)_a(R_2)_b SiX_{4-a-b}$        (I).

With reference to Formula (I), $R_1$ is independently for each "a", a hydrocarbyl group having 1 to 36 carbon atoms and a functional group. The functional group of the hydrocarbyl group is vinyl, allyl, hexenyl, epoxy (oxirane), glycidoxy, (meth)acryloxy, sulfide, isocyanato (—NCO), polysulfide, mercapto, or halogen. With reference to Formula (I), $R_2$ is independently for each "b" a hydrocarbyl group having from 1 to 36 carbon atoms or hydrogen. X of Formula (I) is independently halogen or alkoxy having 1 to 36 carbon atoms; subscript "a" is 0, 1, 2, or 3; subscript "b" is 0, 1, or 2; (a+b) is 1, 2, or 3. With some embodiments, there is the proviso that when b is 1, (a+b) is 2 or 3. With some further embodiments of the present invention, the treating composition further a coupling agent represented by Formula (I), in which X is alkoxy; a is 1; b is 0; and the functional group of the hydrocarbyl of $R_1$, is halogen.

Examples of halo-functional organosilanes, such as those represented by Formula (I), include, but are not limited to, (4-chloromethyl-phenyl)trimethoxysilane, (4-chloromethyl-phenyl)triethoxysilane, [2-(4-chloromethyl-phenyl)-ethyl]trimethoxysilane, [2-(4-chloromethyl-phenyl)-ethyl]triethoxysilane, (3-chloro-propenyl)-trimethoxysilane, (3-chloro-propenyl)-triethoxysilane, (3-chloro-propyl)-triethoxysilane, (3-chloro-propyl)-trimethoxysilane, trimethoxy-(2-p-tolyl-ethyl)silane and/or triethoxy-(2-p-tolyl-ethyl)silane.

In certain embodiments, the additional coupling agent can be present in the slurry in an amount ranging from 0.25 to 30.0 weight percent, such as 1 to 15 weight percent, or 5 to 10 weight percent based on the total mass of $SiO_2$ which has been precipitated.

In certain embodiments, the treating composition useful in the process of the present invention also can further include a sulfur-containing organosilane that is different from the aforementioned optional organosilane coupling agents, such as represented by Formula (I). Non-limiting examples of such materials can include, but are not limited to, organosilanes represented by the following Formula (II):

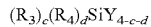

$(R_3)_c(R_4)_d SiY_{4-c-d}$        (II).

With reference to Formula (II), $R_3$ independently for each "c" can be a hydrocarbyl group having 1 to 12 carbon atoms and a functional group. The functional group can be sulfide, polysulfide or mercapto. With reference to Formula (II), $R_4$ independently for each "d" can be a hydrocarbyl group having from 1 to 18 carbon atoms or hydrogen. Each Y each can independently be halogen or an alkoxy group having 1 to 12 carbon atoms. Subscript "c" can be 0, 1, 2, or 3; subscript "b" can be 0, 1, or 2; and c+d can be 1, 2, or 3. With some embodiments, there is the proviso that when b is 1 then a+b is 2 or 3. The $R_3$ and $R_4$ groups of Formula (II) can be selected such that they can react with the polymeric composition in which the treated filler can be incorporated. Additionally, the sulfur-containing organosilane can include bis(alkoxysilylalkyl)polysulfides represented by following Formula (III):

Z'-alk-$S_{n'}$-alk-Z'        (III).

With reference to Formula (III), "alk" represents a divalent hydrocarbon radical having from 1 to 18 carbon atoms; n' is an integer from 2 to 12; and Z' is:

in which $R_5$ is independently an alkyl group having from 1 to 4 carbon atoms or phenyl, and each $R_6$ is independently an alkoxy group having from 1 to 8 carbon atoms, a cycloalkoxy group with from 5 to 8 carbon atoms, or a straight or branched chain alkylmercapto group with from 1 to 8 carbon atoms. The $R_5$ and $R_6$ groups can be the same or different. Also, the divalent alk group can be straight or branched chain, a saturated or unsaturated aliphatic hydrocarbon group or a cyclic hydrocarbon group. Non-limiting examples of bis(alkoxysilylalkyl)-polysulfides can include bis(2-trialkoxysilylethyl)-polysulfides in which the trialkoxy group can be trimethoxy, triethoxy, tri(methylethoxy), tripropoxy, tributoxy, etc. up to trioctyloxy and the polysulfide can be either di-, tri-, tetra-, penta-, or hexasulfide, or mixtures thereof. Further non-limiting examples can include the corresponding bis(3-trialkoxysilylpropyl)-, bis (3-trialkoxysilylisobutyl), -bis(4-trialkoxysilylbutyl)-, etc. up to bis(6-trialkoxysilyl-hexyl)-polysulfides. Further non-limiting examples of bis(alkoxysilylalkyl)-polysulfides are described in U.S. Pat. No. 3,873,489, column 6, lines 5-55, and in U.S. Pat. No. 5,580,919, at column 11, lines 11-41. Further non-limiting examples of such compounds can include: 3,3'bis(trimethoxysilylpropyl)disulfide, 3,3'-bis(triethoxysilylpropyl)tetrasulfide,
3,3'-bis(trimethoxysilylpropyl)tetrasulfide, 2,2'-bis(triethoxysilylethyl)tetrasulfide,
3,3'-bis(trimethoxysilylpropyl)trisulfide, 3,3'-bis(triethoxysilylpropyl)trisulfide,
3,3'-bis(tributoxysilylpropyl)disulfide, 3,3'-bis(trimethoxysilylpropyl)hexasulfide, and
3,3'-bis(trioctoxysilylpropyl)tetrasulfide and mixtures thereof.

The sulfur-containing organosilane also can be a mercaptoorganometallic compound represented by the following Formula (IV):

(IV)

With reference to Formula (IV), M' is silicon, L is halogen or —OR$_8$, Q is hydrogen, $C_1$-$C_{12}$ alkyl, or halo-substituted $C_1$-$C_{12}$ alkyl, R$_7$ is $C_1$-$C_{12}$ alkylene, R$_8$ is $C_1$-$C_{12}$ alkyl or alkoxyalkyl containing from 2 to 12 carbon atoms, the halogen or (halo) groups being chloro, bromo, iodo or fluoro, and n is 1, 2 or 3. In a non-limiting embodiment, mercaptoorganometallic reactants having two mercapto groups can be used.

Non-limiting examples of useful mercaptoorganometallic compounds include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropyl-methyldimethoxysilane, and mixtures thereof.

With some embodiments of the present invention, the sulfur-containing organosilane can be a mercaptoorganometallic compound such as a mercaptosilane different from the organosilane used in the treating composition of step (a), for example, mercaptopropyltrimethoxysilane and/or mercaptomethyltriethoxysilane.

Also, it is contemplated that the sulfur-containing organosilane represented by Formula (IV), which is different from the aforementioned organosilane coupling agent represented by Formula (I), that can be used in step (a) of the process of the present invention, can be a mercaptoorganometallic compound in which the mercapto group is blocked, i.e., the mercapto hydrogen atom is replaced by another group. Blocked mercaptoorganometallic compounds can have an unsaturated heteroatom or carbon bound directly to sulfur via a single bond. Non-limiting examples of specific blocking groups can include thiocarboxylate ester, dithiocarbamate ester, thiosulfonate ester, thiosulfate ester, thiophosphate ester, thiophosphonate ester, and thiophosphinate ester.

With some non-limiting embodiments, in which a blocked mercaptoorganometallic compound is used as an optional coupling material, a deblocking agent can be added to the polymeric compound mixture to deblock the blocked mercaptoorganometallic compound. With some non-limiting embodiments in which water and/or alcohol are present in the mixture, a catalyst, such as, tertiary amines, Lewis acids or thiols, can be used to initiate and promote the loss of the blocking group by hydrolysis or alcoholysis to liberate the corresponding mercaptoorganometallic compounds. Non-limiting examples of blocked mercaptosilanes can include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propylmethylthiosulfate, 3-triethoxysilyl-1-propyltoluenethiosulfonate, and mixtures thereof.

The amount of these optional sulfur-containing organosilanes can vary widely and can depend upon the particular material selected. For example, the amount of these optional sulfur-containing organosilanes can be greater than 0.1% based on the weight of untreated filler, such as from 0.5% to 25% based on the weight of untreated filler, or from 1% to 20%, or from 2% to 15%.

In certain embodiments, the treating composition can further include a halo-functional organosilane, which includes a monomeric, dimeric, oligomeric and/or or polymeric compound possessing halogen functionality and alkanedioxysilyl functionality derived from: (i) polyhydroxyl-containing compounds in which the alkanedioxy group is covalently bonded to a single Si atom through Si—O bonds to form a ring; and/or (ii) the alkanedioxy groups are covalently bonded to at least two Si atoms through Si—O bonds to form a dimer, oligomer, or polymer in which adjacent silyl units are bonded to each other through bridged alkanealkoxy structures. Such halo-functional organosilanes are described in detail in United States Published Patent Application No. 2011/0003922A1, published Jan. 6, 2011, at paragraphs [0020] to [0057], the cited portions of which are incorporated by reference herein.

Mixtures of any of the aforementioned coupling agents can be used in the process of the present invention.

With some embodiments, in addition to treating agent described previously herein, the treating composition can optionally further include a first or additional non-coupling agent/compatibilizer that is different from the treating agent. The additional non-coupling agent/compatibilizer can be selected from saturated biopolymers, saturated fatty acids, saturated organic acids, saturated polymer emulsions, saturated polymer coating composition, and mixtures thereof. The additional non-coupling agent/compatibilizer can alternatively or further include a surfactant selected from anionic, nonionic and amphoteric surfactants, and mixtures thereof. As used herein, the term surfactant excludes unsaturated fatty acids.

The additional non-coupling agent/compatibilizer can, with some embodiments, be present in an amount of from greater than 1% to 25% by weight based on the total weight of untreated filler, such as the total mass of $SiO_2$ which has been precipitated. For example, the additional non-coupling agent/compatibilizer can be chosen from salts of fatty acids, alkyl sarcosinates, salts of alkyl sarcosinates, and mixtures thereof. Specific non-limiting examples of such can be found in U.S. Pat. No. 7,569,107 at column 5, line 9, to column 7, line 21, the cited portions of which are incorporated by reference herein. With some embodiments of the present invention, the additional non-coupling agent/compatibilizer can include one or more anionic surfactants selected from sodium stearate, ammonium stearate, ammonium cocoate, sodium laurate, sodium cocyl sarcosinate, sodium lauroyl sarcosinate, sodium soap of tallow, sodium soap of coconut, sodium myristoyl sarcosinate, and/or stearoyl sarcosine acid.

The additional non-coupling agent/compatibilizer, with some embodiments, is present in an amount of from greater than 1% up to and including 25% by weight, for example 2.0% to 20.0%, or 4% to 15%, or 5% to 12% by weight based on the total weight of the untreated filler, such as total mass of $SiO_2$ that has been precipitated.

With some embodiments, the additional non-coupling agent/compatibilizer can be a non-coupling organosilane. Non-limiting examples of non-coupling silanes from which the additional non-coupling agent/compatibilizer can selected, with some embodiments, include octadecyltriethoxysilane, octadecyltrichlorosilane, octadecyltrimethoxysilane, propyltriethoxysilane, propyltrimethoxysilane, propyltrichlorosilane, n-octyltrimethoxysilane, n-octyltriethoxysilane, n-octyltrichlorosilane, n-hexyltrimethoxysilane, n-hexyltrimethoxysilane, and/or n-hexyltrichlorosilane.

It should be understood that for purposes of the present invention, any of the aforementioned organosilanes, including the organosilane having the structure (I) as described above, can, with some embodiments, include partial hydrolyzates thereof.

The untreated filler used with various embodiments of the present invention, can be prepared using any of a variety of art-recognized methods. For example, in the instance where the untreated filler is untreated silica, the untreated filler can prepared by combining an aqueous solution of soluble metal silicate with acid solution to form a silica slurry; the silica slurry optionally can be aged; acid or base can be added to the optionally aged silica slurry to adjust pH of the slurry; the silica slurry can be filtered, optionally washed, and then dried using art-recognized techniques. A treatment composition such as any of those described above can be added at any step in the above-described process prior to drying in accordance with various embodiments of the present invention.

With some alternative embodiments, the present invention is directed to a process for producing a treated precipitated silica that includes:

(a) combining alkali metal silicate and acid to form an untreated slurry;

(b) optionally, treating the untreated slurry with the treating composition including the treating agent to form a treated slurry;

(c) drying the untreated slurry of (a), or drying the treated slurry of (b), to in each case produce dried precipitated silica;

(d) forming an aqueous slurry of the dried precipitated silica of step (c) with the treatment composition that includes the treating agent to form a treated silica slurry; and (e) drying the treated silica slurry to produce a dried treated precipitated silica.

With some embodiments and with reference to the above-summarized process, whether or not a treatment composition has been included in the untreated slurry prior to drying, an aqueous slurry of the dried precipitated silica (treated or untreated) can be prepared, and a treatment composition can then be added to form a treated slurry of precipitated silica, which is subsequently re-dried to produce a treated precipitated silica.

Additionally, the precipitated silica of any of the foregoing embodiments can be included in a polymer blend and compounded with a treatment composition as described previously herein.

Further detailed description of the process for forming the treated silica can be found herein below in the Examples.

Suitable metal silicates that can be used with some embodiments of the present invention can include a wide variety of materials known in the art. Non-limiting examples can include but are not limited to alumina silicate, lithium silicate, sodium silicate, potassium silicate, and mixtures thereof. The metal silicate can be represented by the following structural formula: $M_2O(SiO2)_x$ wherein M can be alumina, lithium, sodium or, potassium, and x can range from 0.1 to 4.

Suitable acids that can be used with some embodiments of the present invention can be selected from a wide variety of acids known in the art. Non-limiting examples can include but are not limited to mineral acids, organic acids, carbon dioxide, sulfuric acid, and mixtures thereof.

The treated fillers which are prepared by the processes of the present invention are suitable for inclusion in organic polymeric compositions. The treated filler materials prepared by the process of the present invention are useful with some embodiments in rubber compounding compositions, such as rubber compositions used in the manufacture of tires and tire components such as tire treads.

Polymeric compositions into which treated fillers prepared according with the method of the present invention include, but are not limited to, those described in Kirk Othmer *Encyclopedia of Chemical Technology*, Fourth Edition, 1996, Volume 19, pp 881-904, which description is herein incorporated by reference. The treated filler prepared in accordance with various embodiments of the present invention can be admixed with the polymer or the polymerizable components thereof while the physical form of the polymer or polymerizable components is in any liquid or compoundable form such as a solution, suspension, latex, dispersion, and the like. The polymeric compositions containing the treated filler of the present invention can be milled, mixed, molded and, optionally, cured, by any manner known in the art, to form a polymeric article. Classes of polymers can include but are not limited to thermoplastic and thermosetting resins, rubber compounds and other polymers having elastomeric properties.

The aforementioned polymers can include, for example, alkyd resins, oil modified alkyd resins, unsaturated polyesters, natural oils (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, mathacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethyleneacrylate copolymers), organic rubbers (both synthetic and natural rubbers) and the like.

The amount of treated filler that can be used in a polymeric composition can vary widely depending upon the polymeric composition and the desired properties of the article to be formed from the polymeric composition. For example, the amount of treated filler present in the polymeric composition can range from 5 up to 70 weight %, based on the total weight of the polymeric composition.

With some non-limiting embodiments, the polymeric composition can include an organic rubber. Non-limiting examples of such rubbers can include but are not limited to natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinyl-pyridine and its derivatives, acrylonitrile, isobutylene and alkyl-substituted acrylates such as methyl methacrylate. Further non-limiting examples can include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530, 959; 4,616,065; 4,748,199; 4,866,131; 4,894,420; 4,925, 894; 5,082,901; and 5,162,409.

Non-limiting examples of suitable organic polymers can include copolymers of ethylene with other high alpha olefins such as propylene, butene-1 and pentene-1 and a diene monomer. The organic polymers can be block, random, or sequential and can be prepared by methods known in the art such as but not limited to emulsion (e.g. e-SBR) or solution polymerization processes (e.g., s-SBR). Further non-limiting examples of polymers for use in the present invention can include those which are partially or fully functionalized including coupled or star-branched polymers. Additional non-limiting examples of functionalized organic rubbers can include polychloroprene, chlorobutyl and bromobutyl rubber as well as brominated isobutylene-co-paramethylstyrene rubber. In a non-limiting embodiment, the organic rubber can be polybutadiene, s-SBR and mixtures thereof.

The polymeric composition can be a curable rubber. The term "curable rubber" is intended to include natural rubber and its various raw and reclaimed forms as well as various synthetic rubbers. In alternate non-limiting embodiments, curable rubber can include combinations of SBR and butadiene rubber (BR), SBR, BR and natural rubber and any other combinations of materials previously disclosed as organic rubbers. In the description of this invention, the terms "rubber", "elastomer" and "rubbery elastomer" can be used interchangeably, unless indicated otherwise. The terms "rubber composition", "compounded rubber" and "rubber compound" are used interchangeably to refer to rubber which has been blended or mixed with various ingredients and materials, and such terms are well-known to those having skill in the rubber mixing or rubber compounding art.

Rubber compositions that include the treated filler produced by the process of the present invention and can be used in the manufacture of a myriad of rubber articles, such as for example, a tire at least one component of which, e.g., the tread, comprises the cured rubber composition, as well as other rubber articles such as shoe soles, hoses, seals, cable jackets, gaskets, belts, and the like. Rubber compositions comprising the treated filler produced by the process of the present invention are particularly advantageous for use in the manufacture of tire treads exhibiting low rolling resistance and high wear resistance, including when the tire treads are based on natural rubber. Moreover, with some embodiments, lower cure temperatures can be achieved for such natural rubber compositions containing the treated filler produced by the process of the present invention.

The treated filler of the present invention (as a powder, granule, pellet, slurry, aqueous suspension or solvent suspension) may be combined with base material, i.e., material used in the product to be manufactured, to form a mixture referred to as a masterbatch. In the masterbatch, the treated filler may be present in higher concentration than in the final product. Aliquots of this mixture are typically added to production-size quantities during mixing operations in order to aid in uniformly dispersing very small amounts of such additives to polymeric compositions, e.g., plastics, rubbers and coating compositions.

The treated filler may be combined with emulsion and/or solution polymers, e.g., organic rubber comprising solution styrene/butadiene (SBR), polybutadiene rubber or a mixture thereof, to form a masterbatch. One contemplated embodiment is a masterbatch comprising a combination of organic rubber, water-immiscible solvent, treated filler and optionally, processing oil. Such a product may be supplied by a rubber producer to a tire manufacturer. The benefit to the tire manufacturer of using a masterbatch is that the treated filler is uniformly dispersed in the rubber, which results in minimizing the mixing time to produce the compounded rubber. The masterbatch may contain from 10 to 150 parts of treated silica per 100 parts of rubber (phr), preferably, from 20 to 130 phr, more preferably, from 30 to 100 phr, and most preferably, from 50 to 80 phr.

The present invention is more particularly described in the following examples, which are intended to be illustrative only, since numerous modifications and variations therein will be apparent to those skilled in the art. Unless otherwise specified, all parts and all percentages are by weight.

EXAMPLES

Part 1—Analytical Testing

The silica CTAB surface area values reported in the examples of this application were determined using a CTAB solution and the hereinafter described method. The analysis was performed using a Metrohm 751 Titrino automatic titrator, equipped with a Metrohm Interchangeable "Snap-In" 50 milliliter burette and a Brinkmann Probe Colorimeter Model PC 910 equipped with a 550 nm filter. In addition, a Mettler Toledo HB43 or equivalent was used to determine the 105° C. moisture loss of the silica and a Fisher Scientific Centrific™ Centrifuge Model 225 was used for separating the silica and the residual CTAB solution. The excess CTAB was determined by auto titration with a solution of AEROSOL® OT (dioctylsodium sulfosuccinate, available from Cytec Industries, Inc.) until maximum turbidity was attained, which was detected with the probe colorimeter. The maximum turbidity point was taken as corresponding to a millivolt reading of 150. Knowing the quantity of CTAB adsorbed for a given weight of silica and the space occupied by the CTAB molecule, the external specific surface area of the silica was calculated and reported as square meters per gram on a dry-weight basis.

Solutions required for testing and preparation included a buffer of pH 9.6, cetyl [hexadecyl]trimethyl ammonium bromide (CTAB, also known as hexadecyl trimethyl ammonium bromide, technical grade), AEROSOL® OT and 1N sodium hydroxide. The buffer solution of pH 9.6 was prepared by dissolving 3.101 g of orthoboric acid (99%; technical grade, crystalline) in a one-liter volumetric flask, containing 500 milliliters of deionized water and 3.708 grams of potassium chloride solids (Fisher Scientific, Inc., technical grade, crystalline). Using a burette, 36.85 milliliters of the 1N sodium hydroxide solution was added. The solution was mixed and diluted to volume.

The CTAB solution was prepared using 11.0 g+/−0.005 g of powdered CTAB onto a weighing dish. The CTAB powder was transferred to a 2-liter beaker and the weighing dish was rinsed with deionized water. Approximately 700 milliliters of the pH 9.6 buffer solution and 1000 milliliters of distilled or deionized water was added to the 2-liter beaker and stirred with a magnetic stir bar. A large watch glass was placed on the beaker and the beaker was stirred at room temperature until the CTAB powder was totally dissolved. The solution was transferred to a 2-liter volumetric flask, rinsing the beaker and stir bar with deionized water. The bubbles were allowed to dissipate, and the solution diluted to volume with deionized water. A large stir bar was added and the solution mixed on a magnetic stirrer for approximately 10 hours. The CTAB solution can be used after 24 hours and for only 15 days. The AEROSOL® OT solution was prepared using 3.46 g+/−0.005 g, which was placed onto a weighing dish. The AEROSOL® OT on the weighing dish was rinsed into a 2-liter beaker, which contained about 1500 milliliter deionized water and a large stir bar. The AEROSOL® OT solution was dissolved and rinsed into a 2-liter volumetric flask. The solution was diluted to the 2-liter volume mark in the volumetric flask. The AEROSOL® OT solution was allowed to age for a minimum of 12 days prior to use. The shelf life of the AEROSOL® OT solution is 2 months from the preparation date.

Prior to surface area sample preparation, the pH of the CTAB solution was verified and adjusted to a pH of 9.6+/−0.1 using 1N sodium hydroxide solution. For test calculations a blank sample was prepared and analyzed. 5 milliliters of the CTAB solution was pipetted and 55 milliliters deionized water was added into a 150-milliliter beaker and analyzed on a Metrohm 751 Titrino automatic titrator. The automatic titrator was programmed for determination of the blank and the samples with the following parameters: Measuring point density=2, Signal drift=20, Equilibrium time=20 seconds, Start volume=0 ml, Stop volume=35 ml, and Fixed endpoint=150 mV. The burette tip and the colorimeter probe were placed just below the surface of the solution, positioned such that the tip and the photo probe path length were completely submerged. Both the tip and photo probe were essentially equidistant from the bottom of the beaker and not touching one another. With minimum stirring (setting of 1 on the Metrohm 728 stirrer) the colorimeter was set to 100% T prior to every blank and sample determination and titration was initiated with the AEROSOL® OT solution. The end point was recorded as the volume (ml) of titrant at 150 mV.

For test sample preparation, approximately 0.30 grams of powdered silica was weighed into a 50-milliliter container containing a stir bar. Granulated silica samples, were riffled (prior to grinding and weighing) to obtain a representative sub-sample. A coffee mill style grinder was used to grind granulated materials. Then 30 milliliters of the pH adjusted CTAB solution was pipetted into the sample container containing the 0.30 grams of powdered silica. The silica and CTAB solution was then mixed on a stirrer for 35 minutes. When mixing was completed, the silica and CTAB solution were centrifuged for 20 minutes to separate the silica and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker containing a stir bar. Then 10 milliliters of the sample centrifugate was pipetted for analysis into the same beaker. The sample was analyzed using the same technique and programmed procedure as used for the blank solution.

The BET surface area values reported in the examples of this application were determined in accordance with the Brunauer-Emmet-Teller (BET) method in accordance with ASTM D1993-03. The BET surface area was determined by fitting five relative-pressure points from a nitrogen sorption isotherm measurement made with a Micromeritics TriStar 3000™ instrument. A flow Prep-060™ station provided heat and a continuous gas flow to prepare samples for analysis. Prior to nitrogen sorption, the silica samples were dried by heating to a temperature of 160° C. in flowing nitrogen (P5 grade) for at least one (1) hour.

The weight percent carbon (C) and sulfur (S) values reported in the examples of this application were determined using a Flash 2000 elemental analyzer. This system was set up to monitor carbon and sulfur. Typical parameters included: the combustion furnace being set to 950° C., the GC oven temperature being set to 65° C., the carrier helium gas flow rate being set to 140 mL/min, the reference helium gas flow rate being set to 100 mL/min, the oxygen flow rate being set to 250 mL/min and oxygen injection time of 5 seconds. For a given run, calibration standards, samples, and controls were typically run. To each 8-10 mg of vanadium pentoxide ($V_2O_5$) was added. The sample size was between 2-4 mg and they were sealed in tin capsules prior to analysis. If the control standard was not within ±10% relative of the known accepted value or the samples run in duplicate do not match (±5% relative), the entire sample run was reanalyzed.

The weight percent mercaptan (SH) values reported in the examples of this application were determined using a back-titration method. The samples were dispersed in 75 mL of 2-Propanol, followed by addition of excess 0.1N Iodine solution. The test solution was then flushed with nitrogen, capped and allowed to stir for 15 minutes. The unreacted iodine was subsequently back-titrated with standardized 0.05N sodium thiosulfate to a colorless end point.

Part 2—Compound Testing Procedures and Equipment

| Test Methods and Equipment Used | | |
|---|---|---|
| Rubber Property | Test Method | Equipment |
| Process | ASTM D1646-00 | Alpha Technologies Mooney MV2000 Viscometer |
| Cure | ASTM D2084-01 | Monsanto MDR2000 |
| Stress/Strain | ASTM D412-98A | Instron 4204/4400R |
| Density (water) | ISO 2787-2008 | Mettler Toledo XS203S with density kit |
| Rebound | ISO 4662 | Zwick 5109 |
| Hardness | ASTM D2240-02, Shore A | Zwick Digital Durometer |
| Dynamic Properties | ASTM D5992-96, parallel plate geometry | Ares-G2 Rheometer |
| Filler Dispersion | ISO 11345, method B, 100X Magnification, Ref. Lib. G (CB/Silica) | Optigrade AB DisperGrader 1000 NT+ |
| Abrasion Resistance | ASTM D-5963-97A | Hampden Model APH-40 DIN Abrasion Tester |

Example A

Water (74.9 liters) was added to a 150 L reactor tank and heated to 87° C. via indirect steam coil heat. Sodium silicate (3.0 L) was added at a rate of 560 mL/min to achieve a $Na_2O$ concentration of 2.6 g/L and an acid value of 7.8. The $Na_2O$ concentration and acid value were confirmed by titrating the sodium silicate/water mixture using the $Na_2O$ titration method and acid value titration method described above. The temperature was maintained at 87° C. via indirect steam coil heating and the precipitation step was initiated. The 150 liter reactor was agitated via the main tank agitator. The main agitator was left on and a simultaneous addition precipitation step was started. Sodium silicate (50.4 liters) and 3.2 liters of sulfuric acid were added simultaneously over a period of 90 minutes. The sodium silicate was added via an open tube near the bottom of the tank at a rate of 560 ml/min and the sulfuric acid was added directly above the secondary high speed mixer blades. The acid addition rate averaged 36.0 ml/min over the course of the 90 minute simultaneous addition step.

At the end of the simultaneous addition step, a 30 minute age step was initiated (A.2 employed a 100 minute age). The pH of the solution was adjusted to 8.5 using sulfuric acid. SILQUEST® A-1891 (3-mercaptopropyltriethoxysilane, available commercially from Momentive) was added into the reactor at 5.5 parts per hundred silica ("PHS," 744.3 grams). The secondary high speed agitator was turned off and the fatty acids indicated in Table 1 were sprinkled or added into the reactor slowly over the course of 15-20 minutes at 5.5 PHS. The reaction mixture completed ageing under stirring for the remainder of the time (30 minutes for CE-A.1, A.3 and A.4, 100 minutes for A.2). The temperature was maintained at 87° C. After the age step was completed, sulfuric acid was added to reach a final batch pH of 4.8.

The mixture was pumped into a filter press and washed until the conductivity of the rinse water measured less than 1000 microsiemens. The resulting filter cake was reslurried with water to form a pumpable slurry and spray dried using a Niro spray drier (Utility Model 5 with Type FU-1 rotary atomizer, Niro Inc.). The spray dried powder was granulated using an Alexanderwerk WP120X40 Roller Compactor with the following conditions; screw speed=55 rpm, roller speed 4.5 rpm, crusher speed=55 rpm, hydraulic pressure=25 bar and screen size ~7 mesh. The physical properties of the synthesized silicas are summarized in Table 1.

TABLE 1

Silica Treatments

| Example | Compat. Type | CTAB $m^2/g$ | BET $m^2/g$ | C Wt. % |
|---|---|---|---|---|
| CE-A.1 (Comp.) | Stearic acid | 126.0 | 67.0 | 4.1 |
| A.2 | Linoleic acid | 95.0 | 94.0 | 4.3 |
| A.3 | Oleic acid | 98.0 | 67.0 | 4.4 |
| A.4 | Undecylenic acid | 96.0 | 74.0 | 2.9 |

Model Passenger Tread Formulation I

The model passenger tread formulations used to compare the Example A inventive and comparative silicas is shown in Table 2. A 1.89 liter (L) Kobelco Stewart Bolling Inc. mixer (Model "00") equipped with 4 wing rotors and a Farrel 12 inch two-roll rubber mill were used for mixing the ingredients following ASTM D3182-89.

The formulations were mixed using one non-productive pass, allowing the compound to cool, followed by a mill finish on a two roll mill. For the first pass, the mixer speed was adjusted to 85 rpm and a starting temperature of 150° F. Both the solution Styrenebutadiene rubber (SBR), BUNA® VSL 5228-2 (vinyl content: 52%; styrene content: 28%; Treated Distillate Aromatic Extract (TDAE) oil content: 37.5 parts per hundred rubber (phr); Mooney viscosity (ML(1+4)100° C.): 50) obtained commercially from LANXESS, and butadiene rubber (BR), BUDENE™ 1207 (cis 1,4 content 98%; Mooney viscosity (ML(1+4)100° C.): 55) obtained commercially from The Goodyear Tire & Rubber Company, polymers were added to the mixer. After 30 seconds into the mix cycle half of the test silica was added to the mixer. After another 30 seconds into the mix cycle the other half of the test silica as well as the VIVATEC® 500 TDAE processing oil obtained commercially from the H & R Group Inc. was added to the mixer. After another 30 seconds into the mix cycle, the ram was raised and the chute swept, i.e., the covering on the entry chute was raised and any material that was found in the chute was swept back into the mixer and the ram lowered. After another 30 seconds into the mix cycle the combination of KADOX®-720C surface treated zinc oxide, obtained commercially from Zinc Corporation of America, Rubber grade stearic acid, obtained commercially from R.E. Carroll, Stangard SANTOFLEX® 13 antiozonant, described as N-(1,3-dimethylbutyl)-N'-phenyl-p-phenylenediamine, obtained commercially from Harwick Standard and SUN-PROOF® Improved antiozonant hydrocarbon wax obtained commercially from Addivant™ USA, LLC. was added to the mixer. After another 30 seconds, the ram was raised and the chute swept. From 150 seconds into the mix cycle forward the mixer speed was adjusted to reach and/or maintain a temperature of 338° F.+/−5° F. for over a 390 second timeframe. The first pass was dropped at a temperature of 338° F.+/−5° F. after approximately 540 seconds of total mix time.

Rubber Makers sulfur ("RM sulfur"), 100% active, obtained commercially from Taber, Inc., the SANTO-CURE® CBS, n-cyclohexyl-2-benzothiazolesulfenamide obtained commercially from Harwick Standard, and the diphenylguanidine (DPG), obtained commercially from Harwick Standard Inc., were blended into the cooled first pass Masterbatch on a two-roll rubber mill. Milling was done for approximately 5 minutes performing 5 side cuts and 5 end passes.

TABLE 2

Model Passenger Tread Formulation I

| | Additions | CE-A.1A Weight, grams | A.2A | A.3A | A.4A |
|---|---|---|---|---|---|
| PASS 1 Mix Program Step | | | | | |
| POLYMERS | VLS 5228-2 | 494.55 | 493.70 | 494.55 | 494.55 |
| | BR 1207 | 119.92 | 119.71 | 119.92 | 119.92 |
| SILICA 1 | Treated Silica (from Example #) | 206.26 (CE-A.1) | 206.86 (Ex. A.2) | 206.26 (Ex. A.3) | 206.26 (Ex. A.4) |
| SILICA 2 | Treated Silica (From Example #) | 206.26 (CE-A.1) | 206.86 (Ex. A.2) | 206.26 (Ex. A.3) | 206.26 (Ex. A.4) |
| | VIVATEC ® 500 | 23.98 | 23.94 | 23.98 | 23.98 |
| OTHER | Zinc Oxide (720 C.) | 11.99 | 11.97 | 11.99 | 11.99 |
| | Stearic Acid | 4.80 | 4.79 | 4.80 | 4.80 |
| | SANTOFLEX ® 13 | 9.59 | 9.58 | 9.59 | 9.59 |
| | SUNPROOF ® Improved | 7.20 | 7.18 | 7.20 | 7.20 |
| | Subtotal wt: | 1084.56 | 1084.60 | 1084.56 | 1084.56 |

TABLE 2-continued

Model Passenger Tread Formulation I

| Additions | | CE-A.1A Weight, grams | A.2A | A.3A | A.4A |
|---|---|---|---|---|---|
| STOCK SHEETED OFF AT APPROXIMATELY .085" STOCK IS COOLED BEFORE MILL FINISH AFTER A MINIMUM OF ONE HOUR REST | | | | | |
| MILL FINISH | Masterbatch (from Pass 1) | 1084.56 | 1084.60 | 1084.56 | 1084.56 |
| | RM Sulfur | 9.59 | 9.58 | 9.59 | 9.59 |
| | SANTOCURE ® CBS | 14.39 | 14.37 | 14.39 | 14.39 |
| | DPG | 2.40 | 2.39 | 2.40 | 2.40 |
| 18 END PASSES | | | | | |
| | Total wt: | 1110.94 | 1110.94 | 1110.94 | 1110.94 |

Stress/Strain test specimens were cured for 30" at 150° C. while all other test specimens were cured for 40" at 150° C. Specimen preparation and testing were performed using the procedures and equipment shown in Part 2 (above). The compound performance properties are shown in Table 3.

TABLE 3

Model Passenger Tread Formulation Results

| | Example | | | |
|---|---|---|---|---|
| | CE-A.1A | A.2A | A.3A | A.4A |
| Silica component | CE-A.1 | A.2 | A.3 | A.4 |
| Mooney Viscosity, ML(1 + 4) | 69.0 ± 5.0 | 77.6 | 60.7 | 66.8 |
| Stress Strain | | | | |
| 200% Modulus | 9.7 ± 0.9 | 9.0 | 6.8 | 7.7 |
| Elongation | 263 ± 14 | 320.0 | 377.0 | 278.0 |
| Toughness (Tensile * Elongation), MPa * % | 39.5 | 55.7 | 59.8 | 28.4 |
| DIN Abrasion Loss, mm$^3$ | 142 ± 36 | 117.0 | 161.0 | 168.0 |
| ARES - Temperature Sweep, 1 Hz, 2% strain Tan (δ) | | | | |
| @ 60° C. | 0.04 ± 0.009 | 0.06 | 0.06 | 0.07 |
| @ 0° C. | 0.35 ± 0.03 | 0.314 | 0.330 | 0.361 |
| Delta: 0° C.-60° C. | 0.31 ± 0.02 | 0.25 | 0.27 | 0.29 |
| ARES - Strain Sweep, 30° C., 1 Hz | | | | |
| Δ G', 0.5%-16% | 0.030 ± 0.009 | 0.028 | 0.040 | 1.004 |

In comparison to the saturated fatty acid control CE-A.1A, observations as to the impact of unsaturation can be observed. In general, with a constant cure package (as shown in Table 3), the elongation is increased with the use of unsaturated fatty acids. Furthermore, the toughness of two of the compounds is increased relative to the comparative example.

In the case of unsaturated fatty acids, the relative amount of the curatives DPG, CBS and RM Sulfur can be varied to achieve compounds of varying physicochemical properties that would not be achievable from the saturated counterpart. Table 4 demonstrates the effect of varying the amount of the curatives. For example, when varying the accelerator CBS at low and high levels in comparison to a saturated control of the same chain length, properties such as abrasion loss, toughness and hardness can be affected by the type of unsaturation.

TABLE 4

Model Passenger Tread Formulation Results (Cure Adj.)

| | Example | | | | | |
|---|---|---|---|---|---|---|
| | CE-A.1B | CE-A.1C | A.2B | A.2C | A.3B | A.3C |
| Cure Package | Low | High | Low | High | Low | High |
| RM Sulfur (PHR) | 2.0 | 2.0 | 2.0 | 2.0 | 2.0 | 2.0 |
| CBS (PHR) | 1.32 | 4.68 | 1.32 | 4.68 | 1.32 | 4.68 |
| DPG (PHR) | 0.5 | 0.5 | 0.5 | 0.5 | 0.5 | 0.5 |
| Model Tread Formulation | CE-A.1A | CE-A.1A | A.2A | A.2A | A.3A | A.3A |
| Treatment Description | Stearic acid | Stearic acid | Linoleic acid | Linoleic acid | Oleic acid | Oleic acid |
| TS5 | 18.8 | 25.8 | 27.4 | >30" | >30" | >30" |
| Tc90 | 37.1 | 21.9 | 40.3 | 14.2 | 37.0 | 20.8 |
| $M_H M_L$ | 14.6 | 25.4 | 15.0 | 24.0 | 13.8 | 25.5 |
| Mooney Viscosity, ML(1 + 4) | 72.3 | 64.6 | 80.4 | 72.2 | 64.7 | 59.9 |
| Stress Strain | | | | | | |
| 200% Modulus | 6.4 | 12.8 | 5.4 | 11.9 | 3.3 | 9.4 |
| Elongation | 365.0 | 224.0 | 424.0 | 246.0 | 662 | 268 |
| Hardness | 59 | 63 | 57 | 65 | 54 | 61 |

TABLE 4-continued

Model Passenger Tread Formulation Results (Cure Adj.)

| | CE-A.1B | CE-A.1C | A.2B | A.2C | A.3B | A.3C |
|---|---|---|---|---|---|---|
| Toughness (Tensile * Elongation), MPa * % | 5480 | 3230 | 6490 | 3840 | 11850 | 3590 |
| DIN Abrasion Loss, mm$^3$ | 126.0 | 142.0 | 110.0 | 145.0 | 145.0 | 179.0 |
| ARES - Temperature Sweep, 1 Hz, 2% strain Tan (δ) | | | | | | |
| @ 60° C. | 0.080 | 0.037 | 0.105 | 0.047 | 0.103 | 0.05 |
| @ 0° C. | 0.425 | 0.435 | 0.343 | 0.326 | 0.303 | 0.370 |
| Delta: 0° C.-60° C. | 0.345 | 0.397 | 0.238 | 0.279 | 0.200 | 0.320 |

Example B

Water (85.0 liters) was added to the 150 L reactor tank and heated to 74° C. via indirect steam coil heat Sodium silicate (7.7 L) was added at a rate of 383 mL/min to achieve an Na$_2$O concentration of 7.2 g/L. The Na$_2$O concentration was confirmed by titrating the sodium silicate/water mixture using the Na$_2$O titration method described above. The temperature was adjusted as necessary to 74° C. via indirect steam coil heating and the precipitation step was initiated. The 150 liter reactor was agitated via the main tank agitator. The main agitator was left on and a simultaneous addition precipitation step was started. Sodium silicate (34.5 liters) and 2.2 liters of sulfuric acid were added simultaneously over a period of 90 minutes. The sodium silicate was added via an open tube near the bottom of the tank at a rate of 383 ml/min and the sulfuric acid was added directly above the secondary high speed mixer blades. The acid addition rate averaged 24.0 ml/min over the course of the 90 minute simultaneous addition step.

At the end of the simultaneous addition step, the temperature of the reactor was raised to 85° C. The secondary high speed agitator was turned off and unsaturated fatty acids were sprinkled into the reactor slowly over the course of 15-20 minutes at 9.5 PHS as indicated in Table 5. After the compatibilizers were added, sulfuric acid was rapidly added to reach a final batch pH of 4.8. The properties of the fatty acid synthesized silicas are shown in Table 5.

The procedure was varied slightly for the synthesis of treated silicas using fatty acid salts as detailed below.

Specifically, water (74.9 liters) was added to the 150 L reactor tank and heated to 87° C. via indirect steam coil heat Sodium silicate (2.5 L) was added at a rate of 560 mL/min to achieve an Na$_2$O concentration of 2.6 g/L and an acid value of 7.8. The Na$_2$O concentration and acid value were confirmed by titrating the sodium silicate/water mixture using the Na$_2$O titration method and acid value titration method described above. The temperature was adjusted as necessary to 87° C. via indirect steam coil heating and the precipitation step was initiated. The 150 liter reactor was agitated via the main tank agitator. The main agitator was left on and a simultaneous addition precipitation step was started. Sodium silicate (50.4 liters) and 3.2 liters of sulfuric acid were added simultaneously over a period of 90 minutes. The sodium silicate was added via an open tube near the bottom of the tank at a rate of 560 ml/min and the sulfuric acid was added directly above the secondary high speed mixer blades. The acid addition rate averaged 36.0 ml/min over the course of the 90 minute simultaneous addition step.

At the end of the simultaneous addition step, a 100 minute age step was initiated. The pH of the solution was adjusted to 8.5 using sulfuric acid. The secondary high speed agitator was turned off fatty acid salts were sprinkled into the reactor slowly over the course of 15-20 minutes at 8.1 or 9.9 PHS as indicated in Table 6. The reaction mixture completed aging under stirring for the remainder of the 100 minutes. The temperature was maintained at 87° C. After the age step was completed, sulfuric acid was added to reach a final batch pH of 4.8.

Both procedures followed the same wash and drying protocols. The mixture was pumped into a filter press and washed until the conductivity of the rinse water measured less than 1000 microsiemens. The resulting filter cake was reslurried with water to form a pumpable slurry and spray dried using a Niro spray drier (Utility Model 5 with Type FU-1 rotary atomizer, Niro Inc.). The spray dried powder was granulated using an Alexanderwerk WP120X40 Roller Compactor with the following conditions; screw speed=55 rpm, roller speed 4.5 rpm, crusher speed=55 rpm, hydraulic pressure=25 bar and screen size ~7 mesh.

TABLE 5

Free Fatty Acid Treatments

| Example | Compat. Type | CTAB, m$^2$/g | BET, m$^2$/g | C, wt. % |
|---|---|---|---|---|
| CE-B.1 (Comparative) | None | 200 | 300 | 0.0 |
| B.2 | Oleic acid | 197 | 108 | 2.0 |
| B.3 | Stearic acid | 214 | 126 | 4.7 |

TABLE 6

Physical and Chemical Properties of Fatty Acid Salt Treated Silicas

| Example | CTAB, m$^2$/g | BET, m$^2$/g | C, wt. % | Treatment | Treatment Source |
|---|---|---|---|---|---|
| CE-B.4 (Comparative) | 155.0 | 162.0 | 0.0 | — | NA |
| B.5 | 122.0 | 74.0 | 3.3 | Sodium Oleate | TCI America |
| B.6 | 169.0 | 73.0 | 5.5 | Sodium Myristate | TCI America |

Model Passenger Tread Formulation II

The model passenger tread formulations used to compare the Example B inventive and comparative silicas is shown in Table 7. A 1.89 liter (L) Kobelco Stewart Bolling Inc. mixer (Model "00") equipped with 4 wing rotors and a Farrel 12 inch two-roll rubber mill were used for mixing the ingredients following ASTM D3182-89.

The formulations were mixed using one non-productive pass, allowing the compound to cool, followed by a mill finish on a two roll mill. For the first pass, the mixer speed was adjusted to 85 rpm and a starting temperature of 150° F. Both the solution SBR, Buna® VSL 5228-2 (vinyl content: 52%; styrene content: 28%; TDAE oil content: 37.5 phr; Mooney viscosity (ML(1+4)100° C.): 50) obtained commercially from LANXESS, and BR, Budene™ 1207 (cis 1,4 content 98%; Mooney viscosity (ML(1+4)100° C.): 55) obtained commercially from The Goodyear Tire & Rubber Company, polymers were added to the mixer. After 30 seconds into the mix cycle half of the test silica and all of the Si-69, obtained commercially from Evonik, was added to the mixer. After another 30 seconds into the mix cycle the other half of the test silica as well as the Vivatec® 500 TDAE processing oil obtained commercially from the H & R Group Inc. was added to the mixer. After another 30 seconds into the mix cycle, the ram was raised and the chute swept, i.e., the covering on the entry chute was raised and any material that was found in the chute was swept back into the mixer and the ram lowered. The first pass was dropped at a temperature of 320° F.+/−5° F. after approximately 300 seconds of total mix time.

For the second pass, the masterbatch material from the first pass was loaded back into the mixer with Kadox®-720C surface treated zinc oxide obtained commercially from Zinc Corporation of America. After another 30 seconds into the mix cycle the combination of Rubber grade stearic acid, obtained commercially from R.E. Carroll, Stangard Santoflex® 13 antiozonant, described as N-(1,3-dimethylbutyl)-N-phenyl-p-phenylenediamine, obtained commercially from Harwick Standard and Sunproof® Improved antiozonant hydrocarbon wax obtained commercially from Addivant™ USA, LLC. was added to the mixer. After another 30 seconds, the ram was raised and the chute swept. From 150 seconds into the mix cycle forward the mixer speed was adjusted to reach and/or maintain a temperature of 320° F.+/−5° F. for over a 660 second timeframe. The Rubber Makers (RM) sulfur, 100% active, obtained commercially from Taber, Inc., the Santocure® CBS, n-cyclohexyl-2-benzothiazolesulfenamide obtained commercially from Harwick Standard, and the diphenylguanidine, obtained commercially from Harwick Standard Inc., were blended into the cooled second pass Masterbatch on a two-roll rubber mill. Milling was done for approximately 5 minutes performing 5 side cuts and 5 end passes.

Stress/Strain test specimens were cured for 30″ at 150° C. while all other test specimens were cured for 40″ at 150° C. Specimen preparation and testing were performed using the procedures and equipment shown in Part 2 (above). The compound performance properties are shown in Table 8.

TABLE 7

Model Passenger Tread Formulation I

| | Additions | CE-B.1A Weight, grams | B.2A | B.3A |
|---|---|---|---|---|
| PASS 1 Mix Program Step | | | | |
| POLYMERS | VLS 5228-2 | 504.26 | 504.26 | 504.26 |
| | BR 1207 | 122.27 | 122.27 | 122.27 |
| SILICA ADDITION 1 | Silica (from Example #) | 195.64 (CE-B.1) | 195.64 (B.2) | 195.64 (B.3) |
| SILANE | Si-69 | 34.24 | 34.24 | 34.24 |
| SILICA ADDITION 2 | Silica (from Example #) | 195.64 (CE-B.1) | 195.64 (B.2) | 195.64 (B.3) |
| | VIVATEC® 500 | 24.45 | 24.45 | 24.45 |
| PASS 2 | Zinc Oxide (720 C.) | 12.23 | 12.23 | 12.23 |
| | Stearic Acid | 4.89 | 4.89 | 4.89 |
| | SANTOFLEX® 13 | 9.78 | 9.78 | 9.78 |
| | SUNPROOF® Improved | 7.34 | 7.34 | 7.34 |
| | Subtotal wt: | 1110.74 | 1110.74 | 1110.74 |

STOCK SHEETED OFF AT APPROXIMATELY .085″ STOCK COOLED BEFORE MILL FINISH AFTER A MINIMUM OF ONE HOUR REST

| MILL FINISH | Masterbatch | 1110.74 | 1110.74 | 1110.74 |
|---|---|---|---|---|
| | RM Sulfur | 6.85 | 6.85 | 6.85 |
| | SANTOCURE® CBS | 8.31 | 8.31 | 8.31 |
| | DPG | 9.78 | 9.78 | 9.78 |
| 18 END PASSES | | | | |
| | Total wt: | 1135.68 | 1135.68 | 1135.68 |

TABLE 8

Model Passenger Tread Formulation Results

| | Example | | |
|---|---|---|---|
| | CE-B.1A | B.2A | B.3A |
| Mooney Viscosity, ML(1 + 4) | 107 | 69.8 | 69.7 |
| Ts5 | 7.8 | 12.4 | 14.8 |
| Stress Strain | | | |
| 200% Modulus | 6.7 | 4.7 | 6.1 |
| $M_H - M_L$ | 18.2 | 16.5 | 18.5 |
| Hardness | 61 | 60 | 57 |
| Elongation | 341 | 409 | 446 |
| Toughness (Tensile * Elongation), MPa * % | 5830 | 6010 | 10080 |
| ARES - Temperature Sweep, 1 Hz, 2% strain Tan (δ) | | | |
| @ 60° C. | 0.08 | 0.09 | 0.06 |
| @ 0° C. | 0.33 | 0.36 | 0.34 |
| Delta: 0° C.-60° C. | 0.25 | 0.27 | 0.28 |
| ARES - Strain Sweep, 30° C., 1 Hz | | | |
| G'@0.5% | 2.1 | 2.3 | 1.8 |

When compatibilizers are used on lower surface area silicas, the compatibilizing effect is also observed in the reduction of the ML(1+4) Mooney viscosity. Examples B.2A and B.3A show higher toughness values than those of comparative example CE-B.1A. The salt form can also be used to react the material to the silica. Table 9 shows the compounding recipe and Table 10 shows compounding results.

TABLE 9

Model Passenger Tread Formulation II

| | Additions | B.4-6 Weight, grams |
|---|---|---|
| PASS 1 Mix Program Step | | |
| POLYMERS | VLS 5228-2 | 504.26 |
| | BR 1207 | 122.27 |
| SILICA ADDITION 1 | Silica of respective Example B | 195.64 |
| SILANE | Si-69 | 34.24 |
| SILICA ADDITION 2 | Silica of respecitve Example B | 195.64 |
| | VIVATEC ® 500 | 24.45 |
| PASS 2 | Zinc Oxide (720 C.) | 12.23 |
| | Stearic Acid | 4.89 |
| | SANTOFLEX ® 13 | 9.78 |
| | SUNPROOF ® Improved | 7.34 |
| | Subtotal wt: | 1110.74 |
| SHEET STOCK OFF AT APPROXIMATELY .085" MAKE SURE STOCK IS COOL BEFORE MILL FINISH AFTER A MINIMUM OF ONE HOUR REST | | |
| MILL FINISH | Masterbatch | 1110.74 |
| | RM Sulfur | 6.85 |
| | SANTOCURE ® CBS | 8.31 |
| | DPG | 9.78 |
| | 18 END PASSES | |
| | Total wt: | 1135.68 |

TABLE 10

Compounding Properties of Silicas Treated with Fatty Acid Salts

| | Example | | |
|---|---|---|---|
| | CE-B.4A | B.5A | B.6A |
| Mooney Viscosity, ML(1 + 4) | 83.0 | 62.9 | 54.4 |
| Ts5 | 8.7 | 9.9 | 9.9 |
| Stress Strain | | | |
| 200% Modulus | 7.4 | 7.6 | 7.1 |
| $M_H - M_L$ | 23.0 | 20.6 | 16.3 |
| Hardness | 59 | 58 | 57 |
| Elongation | 333 | 273 | 355 |
| Toughness (Tensile * Elongation), MPa * | 6330 | 3390 | 5890 |
| ARES - Temperature Sweep, 1 Hz, 2% strain Tan (δ) | | | |
| @ 60° C. | 0.07 | 0.06 | 0.07 |
| @ 0° C.-60° C. | 0.30 | 0.27 | 0.32 |
| Delta: 0° C.-60° C. | 0.23 | 0.21 | 0.25 |
| ARES - Strain Sweep, 30° C., 1 Hz | | | |
| G'@0.5% | 2.1 | 1.6 | 1.8 |

A reduction in the Mooney viscosity, ML(1+4) is observed for the inventive silicas with respect to the comparative example.

Although the present invention has been described with references to specific details of certain embodiments thereof, it is not intended that such details should be regarded as limitations upon the scope of the invention except in so far as they are included in the claims.

What is claimed is:

1. A process for producing treated filler comprising:
 (a) treating a slurry comprising untreated filler wherein said untreated filler has not been previously dried, with a treating composition comprising a treating agent which is a coupling agent, thereby forming a treated filler slurry; and
 (b) drying said treated filler slurry to produce treated filler, wherein said treating agent comprises at least one of:
  (i) an unsaturated fatty acid comprising a linear or branched, optionally substituted $C_4$ to $C_{38}$ alkyl having at least one carbon-carbon double bond; and/or
  (ii) a derivative of said unsaturated fatty acid of (i), wherein at least one carbon-carbon double bond is reacted to include at least one functional group,
 wherein said unsaturated fatty acid (i), and said unsaturated fatty acid of said derivative (ii) are in each case the same or different, and
 wherein said unsaturated fatty acid (i), and said unsaturated fatty acid of said derivative (ii) are each independently selected from the group consisting of undecylenic acid, α-linolenic acid, arachidonic acid, docosahexaenoic acid, eicosapentaenoic acid, elaidic acid, erucic acid, linoleic acid, conjugated linoleic acid, linolelaidic acid, sapienic acid, vaccenic acid, myristoleic acid, palmitoleic acid, oleic acid, gadoleic acid, nervonic acid, and combinations thereof.

2. The process of claim 1, wherein said untreated filler is chosen from aluminum silicate, silica gel, colloidal silica, precipitated silica, and mixtures thereof.

3. The process of claim 1, wherein the filler comprises precipitated silica.

4. The process of claim 1, wherein the unsaturated fatty acid is at least one of oleic acid and undecylenic acid.

5. The process of claim 1, wherein the derivative (ii) is present in the treating composition and each functional group of said derivative (ii) is independently selected from ketone, thiol, sulfido, halo, amino, alkenyl, alkynyl, hydroxyl, anhydride, and oxirane.

6. The process of claim 1, wherein the treating composition further comprises an organosilane coupling agent represented by the following the following Formula (I):

$$(R_1)_a(R_2)_b SiX_{4-a-b} \qquad (I),$$

wherein each $R_1$ is independently a hydrocarbyl group comprising 1 to 36 carbon atoms and a functional group, wherein the functional group of the hydrocarbyl group is vinyl, allyl, hexenyl, epoxy, glycidoxy, (meth)acryloyl, sulfide, isocyanato, polysulfide, mercapto, or halogen; each $R_2$ is independently a hydrocarbyl group having from 1 to 36 carbon atoms or hydrogen, X is independently halogen or alkoxy having 1 to 36 carbon atoms; a is 0, 1, 2, or 3; b is 0, 1, or 2; (a+b) is 1, 2, or 3; provided that when b is 1, (a+b) is 2 or 3.

7. The process of claim 6, wherein the treating composition further comprises an organosilane different from the organosilane represented by Formula (I).

8. The process of claim 1, wherein the treating composition further comprises an organosilane selected from the group consisting of (4-chloromethyl-phenyl) trimethoxysilane, (4-chloromethyl-phenyl) triethoxysilane, [2-(4-chloromethyl-phenyl)-ethyl] trimethoxysilane, [2-(4-chloromethyl-phenyl)-ethyl] triethoxysilane, (3-chloro-propenyl)-trimethoxysilane, (3-chloro-propenyl)-triethoxysilane, (3-chloro-propyl)-triethoxysilane, (3-chloro-propyl)-trimethoxysilane, trimethoxy-(2-p-tolyl-ethyl) silane and triethoxy-(2-p-tolyl-ethyl)silane, and combinations thereof.

9. The process of claim 1, wherein the treatment composition further comprises a non-coupling agent and wherein the non-coupling agent is one or more of a biopolymer, fatty acid, organic acid, polymer emulsion, polymer coating composition, and combinations thereof, and wherein the non-coupling agent differs from the treating agent.

10. The process of claim 1, wherein the treatment composition further comprises a non-coupling agent selected from an anionic surfactant, a nonionic surfactant, an amphoteric surfactant, and combinations thereof, present in an amount of from greater than 1% to 25% by weight based on the weight of untreated filler.

11. The process of claim 1, wherein
the treated filler comprises treated precipitated silica; and the treating composition further comprises:
(i) at least one coupling agent different from the treating agent, and
(ii) non-coupling agent chosen from anionic, nonionic and/or amphoteric surfactants, which is present in an amount of from greater than 1% to 25% by weight based on the weight of untreated filler.

12. A process for producing treated precipitated silica comprising:
(a) combining an alkali metal silicate and an acid to form a slurry comprising untreated silica, wherein said untreated silica has not been previously dried;
(b) treating said slurry with a treating composition comprising a treating agent which is a coupling agent, thereby forming a treated slurry; and
(c) drying said treated slurry to produce a treated precipitated silica, wherein said treating agent comprises at least one of:
(i) an unsaturated fatty acid comprising a linear or branched, optionally substituted $C_4$ to $C_{38}$ alkyl 1 having at least one carbon-carbon double bond; and/or
(ii) a derivative of said unsaturated fatty acid of (i), wherein at least one carbon-carbon double bond is reacted to include at least one functional group;
wherein said unsaturated fatty acid (i), and said unsaturated fatty acid of said derivative (ii) are in each case the same or different, and
wherein said unsaturated fatty acid (i), and said unsaturated fatty acid of said derivative (ii) are each independently selected from the group consisting of undecylenic acid, α-linolenic acid, arachidonic acid, docosahexaenoic acid, eicosapentaenoic acid, elaidic acid, erucic acid, linoleic acid, conjugated lineoleic acid, linoelaidic acid, sapienic acid, vaccenic acid, myristoleic acid, palmitoleic acid, oleic acid, gadoleic acid, nervonic acid, and combinations thereof.

13. The process of claim 12, wherein said alkali metal silicate comprises aluminum silicate, lithium silicate, sodium silicate, and/or potassium silicate.

14. The process of claim 12, wherein the unsaturated fatty acid is at least one of oleic acid and undecylenic acid.

15. The process of claim 12, wherein the derivative (ii) is present in the treating composition and each functional group of said derivative (ii) is independently selected from ketone, thiol, sulfido, halo, amino, alkenyl, alkynyl, hydroxyl, anhydride, and oxirane.

16. The process of claim 12, wherein the treating composition further comprises a coupling agent comprising an organosilane, selected from the group consisting of (4-chloromethyl-phenyl) trimethoxysilane, (4-chloromethyl-phenyl) triethoxysilane, [2-(4-chloromethyl-phenyl)-ethyl] trimethoxysilane, [2-(4-chloromethyl-phenyl)-ethyl] triethoxysilane, (3-chloro-propenyl)-trimethoxysilane, (3-chloro-propenyl)-triethoxysilane, (3-chloro-propyl)-triethoxysilane, (3-chloro-propyl)-trimethoxysilane, trimethoxy-(2-p-tolyl-ethyl) silane and triethoxy-(2-p-tolyl-ethyl)silane, and combinations thereof.

17. The process of claim 12, wherein the treatment composition further comprises a non-coupling agent selected from an anionic surfactant, a nonionic surfactant, an amphoteric surfactant, and combinations thereof, present in an amount of from greater than 1% to 25% by weight based on the weight of untreated filler.

18. A process for producing treated precipitated silica comprising:
(a) combining an alkali metal silicate and an acid to form an untreated slurry comprising untreated silica, wherein said untreated silica has not been previously dried;
(b) drying the untreated slurry to produce dried precipitated silica;
(c) forming an aqueous slurry of the dried precipitated silica with a treating composition comprising a treating agent which is a coupling agent, and, optionally, a coupling agent which is different from the treating agent and/or, optionally, a non-coupling agent to form a treated precipitated silica slurry; and
(d) drying the treated precipitated silica slurry to produce a dried treated precipitated silica,
wherein said treating agent comprises at least one of:
(i) an unsaturated fatty acid comprising a linear or branched, optionally substituted $C_4$ to $C_{38}$ alkyl having at least one carbon-carbon double bond; and/or
(ii) a derivative of said unsaturated fatty acid of (i), wherein at least one carbon-carbon double bond is reacted to include at least one functional group;
wherein said unsaturated fatty acid (i), and said unsaturated fatty acid of said derivative (ii) are in each case the same or different, and
wherein said unsaturated fatty acid (i), and said unsaturated fatty acid of said derivative (ii) are each independently selected from the group consisting of undecylenic acid, α-linolenic acid, arachidonic acid, docosahexaenoic acid, eicosapentaenoic acid, elaidic acid, erucic acid, linoleic acid, conjugated lineoleic acid, linoelaidic acid, sapienic acid, vaccenic acid, myristoleic acid, palmitoleic acid, oleic acid, gadoleic acid, nervonic acid, and combinations thereof.

19. The process of claim 18, wherein the unsaturated fatty acid is at least one of oleic acid and undecylenic acid.

20. The process of claim 18, wherein the derivative (ii) is present in the treating composition and each functional group of said derivative (ii) is independently selected from ketone, thiol, sulfido, halo, amino, alkenyl, alkynyl, hydroxyl, anhydride, and oxirane.

* * * * *